United States Patent
Shih et al.

(10) Patent No.: US 7,132,070 B2
(45) Date of Patent: Nov. 7, 2006

(54) METHOD OF MANUFACTURING POLISHING PAD

(75) Inventors: Wen-Chang Shih, Taichung (TW); Yung-Chung Chang, Taipei (TW); Min-Kuei Chu, Taichung (TW); Lung-Chen Wei, Taichung (TW)

(73) Assignee: IV Technologies, Co., Ltd., Taichung (TW)

( * ) Notice: Subject to any disclaimer, the term of this patent is extended or adjusted under 35 U.S.C. 154(b) by 379 days.

(21) Appl. No.: 10/438,406

(22) Filed: May 14, 2003

(65) Prior Publication Data

US 2004/0096529 A1 May 20, 2004

(30) Foreign Application Priority Data

Nov. 19, 2002 (TW) ............................. 91133682 A

(51) Int. Cl.
*B29C 44/02* (2006.01)
*B29C 44/06* (2006.01)

(52) U.S. Cl. .................. 264/51; 264/219; 264/255; 264/317

(58) Field of Classification Search ............... 264/51, 264/219, 317, 255
See application file for complete search history.

(56) References Cited

U.S. PATENT DOCUMENTS

| | | | |
|---|---|---|---|
| 4,841,680 A | 6/1989 | Hoffstein et al. ............ 51/283 |
| 5,061,427 A * | 10/1991 | Hirzel ........................ 264/219 |
| 5,212,910 A | 5/1993 | Breivogel et al. ........... 51/398 |
| 5,257,478 A | 11/1993 | Hyde et al. ................ 51/131.3 |
| 5,489,233 A * | 2/1996 | Cook et al. .................. 451/41 |
| 5,569,062 A | 10/1996 | Karlsrud |
| 5,989,470 A * | 11/1999 | Doan et al. ................ 264/261 |
| 6,022,268 A | 2/2000 | Roberts et al. ............. 451/548 |
| 6,095,902 A | 8/2000 | Reinhardt |
| 6,267,659 B1 | 7/2001 | Chen et al. ................ 451/533 |
| 6,290,883 B1 | 9/2001 | Crevasse et al. ............ 264/50 |
| 6,531,078 B1 * | 3/2003 | Laine et al. ................. 264/86 |
| 6,627,671 B1 | 9/2003 | Kihara et al. .............. 521/159 |
| 6,641,471 B1 | 11/2003 | Pinheiro et al. ........... 451/526 |
| 6,645,264 B1 | 11/2003 | Hasegawa et al. .......... 51/299 |
| 6,758,735 B1 | 7/2004 | Blalock ..................... 451/528 |
| 6,777,455 B1 | 8/2004 | Seyanagi et al. .......... 521/110 |
| 6,786,945 B1 * | 9/2004 | Machii et al. ............... 51/307 |
| 6,848,974 B1 | 2/2005 | Hasegawa et al. .......... 451/41 |
| 2004/0021243 A1 | 2/2004 | Shih et al. .................. 264/51 |

FOREIGN PATENT DOCUMENTS

| | | |
|---|---|---|
| JP | 04-249116 | 9/1992 |
| JP | 2001-232554 | 8/2004 |
| TW | 491755 | 6/2000 |
| WO | WO 02/067309 * | 8/2002 |

* cited by examiner

*Primary Examiner*—Allan R. Kuhns
(74) *Attorney, Agent, or Firm*—J.C. Patents

(57) ABSTRACT

A method of manufacturing a polishing pad is described. A mold having a mold cavity therein is provided. At least a strip is buried in the mold. A polymer foam material is injected into the mold cavity of the mold. The polymer foam material is cured to mold the polymer foam material into a molding polymer article. A mold release process is performed to obtain the molding polymer article. The strip on the molding article is removed to form a polishing pad having at least one groove thereon.

28 Claims, 2 Drawing Sheets

METHOD OF MANUFACTURING POLISHING PAD

CROSS-REFERENCE TO RELATED APPLICATION

This application claims the priority benefit of Taiwan application serial no. 91133682, filed Nov. 19, 2002.

BACKGROUND OF THE INVENTION

1. Field of the Invention

The present invention relates to a method of manufacturing a polishing pad. More particularly, the present invention relates to a method of manufacturing a polishing pad having grooves thereon.

2. Background of the Invention

In an integrated circuit fabrication, Chemical Mechanical Polishing (CMP) is one of the most important global planarization techniques to remove minute unevenness on a wafer surface to achieve planarization. The technique uses of a grinder-like mechanical polishing theory, so that an uneven surface profile of a wafer can be planarized when an appropriate reagent is used. During a polishing process, the polishing pad moves on the wafer, and the abrasive particles of the reagent pressed by the polishing pad contact with and slide on the wafer, so that the wafer is polished due to the friction between the wafer and the abrasive particles. The softness, the hardness, and the roughness of the physical property of the polishing pad have an effect on the interaction between the abrasive particles in the slurry, so that the interaction becomes irregular in the horizontal direction and the vertical direction. Under a prescribed pressure, a force in the horizontal direction is one of the important factors, which decides the quality of the planarization. The polishing pad must sustain the press of the polishing head of the wafer to maintain the planarization. In addition, the distribution of the abrasive particles in the slurry is very important to the uniformity of the polished surface of the wafer. Accordingly, the polishing pad must have enough hardness to provide the polishing function and have enough cells to hold the slurry.

The polishing pad further has grooves formed thereon. The grooves provide a roughness surface to benefit polishing and advantage the uniformity of the slurry distribution. The larger grooves can promote the fine particles in the slurry to disperse uniformly and can hold much of the removal residue and inactive slurry. However, the polishing presses cannot maintain coincidence if the grooves too large. Accordingly, the planarization of the polished surface is lower.

A method of manufacturing polishing pad in the prior art has been disclosed. A polymer material is injected into a mold. After the polymer is cured and molded, a mold release process is performed to obtain a molding article. Afterwards, the molding article is cut by a lathe or a machining center to form the desired feature of grooves.

In addition, U.S. Pat. No. 4,841,680 and 6,095,902 of Rodel Inc. disclose methods of manufacturing polishing pad. The former describes a poromeric polishing pad formed on a first substrate is formed using solvent/non-solvent polymer coagulation technology and high temperature to evaporate the residue solvent. Thereafter, a second substrate is affixed to the top of the poromeric layer, and the first substrate and the poromeric base layer are removed using a blade or a rotating abrasive cylinder to expose and open the underlying cell. The latter describes that the solid ingredients are mixed, melted, and reacted in a mold to form a cake. The cake is then sliced or cut to form polishing layers and then the polishing layer is affixed to a backing or supporting layer to form a polishing pad.

However, in the above methods, the steps of polishing the pad comprise molding, removing the manufacturing substrate/cutting to form layers and bonding. Accordingly, the process requires much time and work. In addition, the processes of removing the manufacturing substrate/cutting to form layers are difficult to control. Therefore, the size of the cells are not uniform, the surface cells are smaller, the opening walls of the working surface increase, and the diameter of surface cell is smaller than the diameter of the underlying cell. Accordingly, the polishing stability is low.

On the other hand, Taiwan Patent Appl. No. 90,123,032 of Rodel Inc in U.S.A. discloses a method of manufacturing a polishing pad having a micro-texture thereon. The microtexture was created by utilizing an Ikegai, Model AX4 ON lathe and a lathe bit made from high-speed tool steel mounted in a standard bit holder. The tool was applied to the pad surface at a cut depth of 0.013 mm and translated in one pass on a linear path across the pad surface along the equator. The speed controller adjusted the rotational speed of the pad to maintain a constant tool velocity relative to the pad (in the azimuthal direction) of 6 meters/min. Cutting debris was removed using a 3.5 HP Sears Craftsman Wet/Dry Vacuum. However, the grooves on the polishing pad are formed by means of cutting, so that the sharp and the linear velocity of the blade, the temperature and the humidity of the atmosphere are not fixed. Accordingly, the numbers of the macro defects formed on the polishing pad are different and the performances of each polishing pad have a large difference.

SUMMARY OF THE INVENTION

The present invention provides a method of manufacturing a polishing pad to solve the stability issue of the polishing pad in the prior art.

The present invention provides a method of manufacturing polishing pad to solve the problem of the difference of performance of each polishing pad because of the difference of the number of the macro defects in the prior art.

The present invention provides a method of manufacturing a polishing pad. A mold having a mold cavity therein is provided. Strips are buried in the mold. A cross-sectional shape of the strips comprises a polygon form, an arc form or an irregular form, for example, a triangular shape, a hexagon shape, a circular shape, a square shape, a rectangular shape, a spiral shape, a tree-form or a radiative form. The strips buried in the mold are arranged to a radiative form, a concentric circle form, a grid form, a triangle form, a spiral form, a rhombus form or a perforation form. The material of the strips comprises a polymer material or a metal material, wherein the polymer material comprises polypropylene (PP), polyethylene (PE) or polytetrafluoroethylene (PTFE). A polymer foam material is injected into the mold cavity of the mold after the strips are buried in the mold. The polymer foam material is cured and molded. Thereafter, a mold release process is performed to obtain a molding polymer article. The polymer foam material comprises a polyurea (PU) foam material. The method of manufacturing the polyurea foam material and the process condition thereof has been disclosed by Applicant in Taiwan Application number 91,117,406. The strips on the molding article are removed from the molding polymer article to form a polishing pad having grooves thereon. The pattern of the grooves are transferred from the strips, so that the pattern of the grooves comprise a radiative form, a concentric circle form, a grid form, a triangle form, a spiral form, a rhombus form or a perforation form to improve the uniformity of the slurry distribution.

The present invention also provides a method of manufacturing a polishing pad. A mold having a mold cavity therein is provided. Strips are buried in the mold. The cross-sectional shape of the strips comprises a polygon form, an arc form or an irregular form, for example, a triangular shape, a hexagon shape, a circular shape, a square shape, a rectangular shape, a spiral shape, a tree-form or a radiative form. The strips buried in the mold are arranged in a radiative form, a concentric circle form, a grid form, a triangle form, a spiral form, a rhombus form or a perforation form. The material of the strips comprises a polymer material or a metal material, wherein the polymer material comprises polypropylene, polyethylene or polytetrafluoroethylene. A first polymer foam material such as a polyurea (PU) foam material is injected into the mold cavity of the mold after the strips are buried in the mold. The first polymer foam material is cured and molded. Thereafter, a second polymer material is injected into the mold cavity of the mold and then the second polymer material is cured and molded. Thereafter, a mold release process is performed to obtain a molding polymer article having two shaped layers. The method of manufacturing the polyurea foam material and the process condition thereof has been disclosed by Applicant in Taiwan Application number 91,117,406. The second polymer material comprises a polyurea material, a silicone rubber, polybutadiene rubber, poly (vinyl chloride) latex or poly (methyl methacrylate) latex. The strips on the molding article are removed from the molding polymer article to form a polishing pad having grooves thereon. The pattern of the grooves are transferred from the strips, so that the pattern of the grooves comprises a radiative form, a concentric circle form, a grid form, a triangle form, a spiral form, a rhombus form or a perforation form to improve the uniformity of the slurry distribution. In particular, the polishing pal is composed of two shaped layers, wherein the upper layer is harder than the lower layer. During a polishing process; the harder upper layer provides a better flatness, while the softer lower layer serving as a buffer layer providing a better uniformity.

In the present invention, the strips can be replaced by dots. That is, the dots are buried in the mold and then the polymer foam material is injected into the mold cavity of the mold. The polymer foam material is cured and molded. Thereafter, a mold release process is performed to obtain a molding polymer article. The dots in the molding article are removed from the molding polymer article to form a polishing pad having dot shaped cavities thereon.

In the method of manufacturing polishing pad of this invention, the strips having various shapes, which are made of a polymer material or a metal, are buried in the mold and then the polymer foam material is injected in the mold cavity of the mold. After the polymer foam material is cured and molded, the strips are removed by applying an external force while removing of the skin of the molded polymer foam material. Therefore, a polishing pad having grooves is formed.

The polishing pad having grooves is formed by the above-mentioned method, so its fabrication is simpler than that of the prior art.

In the prevent invention, the pattern of the grooves of the polishing pad is not designed on the mold and the depth and the shape of the grooves are dependant on the size and the shape of the strips. Therefore, the depth and the shape of the grooves vary easily according to the demand.

In the prevent invention, the grooves of the polishing pad are formed by burying and removal the strips in the mold, so that the pattern of the grooves comprise various complex patterns, which can not be produced by a blade.

In the prior art, since the sharp and the linear velocity of the blade, and the temperature and the humidity of the atmosphere are not fixed, the number of the macro defects formed on the polishing pad are different, and the performance of each polishing pad has a large difference. However, in the present invention, the grooves are not formed by a cutting means, and the drawbacks of the difference in the number of the macro defects on the polishing pad can be prevented. Therefore, the performance of each polishing pad is more uniform.

In the present invention, since the grooves of the polishing pad are not formed by a cutting means, there is not debris produced. Therefore, a vacuum cleaner is not necessary in this invention.

It is to be understood that both the foregoing general description and the following detailed description are exemplary, and are intended to provide further explanation of the invention as claimed.

DESCRIPTION OF THE PREFERRED EMBODIMENTS

First Embodiment

Figure 1:
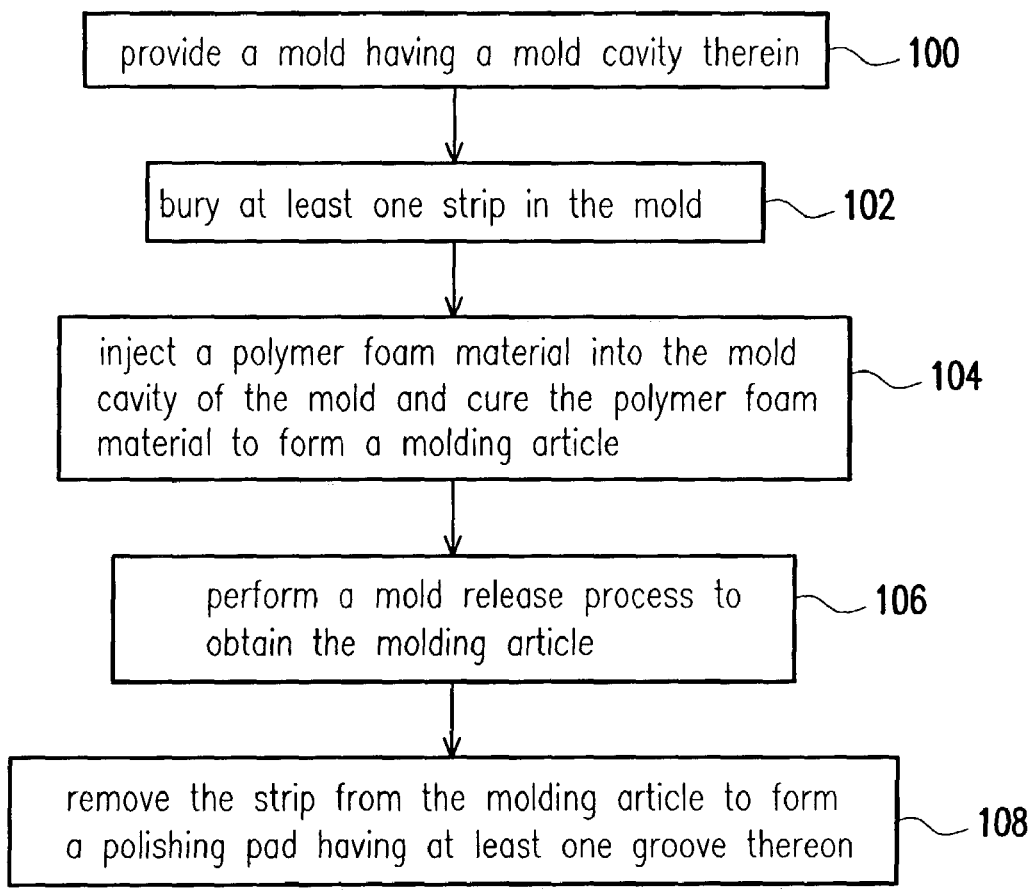
FIG. 1 schematically illustrates a flow chart of manufacturing a polishing pad with a single-layered structure according to a first preferred embodiment of the present invention.

FIG. 1 schematically illustrates a flow chart of manufacturing a polishing pad with a single-layered structure according to the first preferred embodiment of the present invention.

Referring to FIG. 1, a mold having a mold cavity therein is provided (step 100). The size of the mold cavity is suitable for forming a desired polishing pad. Thereafter, strips are previously buried in the mold (step 102). A cross-sectional shape of the strips comprises a polygon form, an arc form or an irregular form; for example, a triangular shape, a hexagon shape, a circular shape, a square shape, a rectangular shape, a spiral shape, a tree-form or a radiative form, etc. Those strips are arranged to form a radiative form, a concentric circle form, a grid form, a triangle form, a spiral form, a rhombus form or a perforation form. In this embodiment, materials of the strips comprise a polymer material or a metal material, wherein the polymer material can be polypropylene, polyethylene or polytetrafluoroethylene, for example.

After the strips have been buried in the mold cavity of the mold, a polymer foam material, such as a polyurea foam material, is injected into the mold cavity of the mold by a reaction injection molding means. Afterwards, the polymer foam material is cured to mold the polymer foam material into a molding polymer article (step 104). A mold release process is performed to obtain the molding polymer article (step 106). Thereafter, the strips on the molding article are removed to form a polishing pad having at least one groove thereon (step 108). The strips are removed from the molding article by a scraping method or by applying an external force to draw out the strips.

The pattern of the grooves on the polishing pad is transferred from the strips buried in the mold cavity of the mold, so that the pattern of the grooves comprises a radiative form, a concentric circle form, a grid form, a triangle form, a spiral form, a rhombus form or a perforation form. In addition, in this embodiment, a width of the grooves is about 0.5 to 15 mm, a depth of the grooves is about 0.2 to 2.5 mm, and a pitch of the grooves is about 0.2 to 20 mm It should be noted that the strips comprise a decomposable material or a water-soluble polymer material. Consequently, after the mold release process is performed and the molding article is obtained (step 106), a decomposed process or a hydrolysis process can be performed to remove the strips on the molding article and then the polishing pad having grooves is obtained.

Second Embodiment

Figure 2:
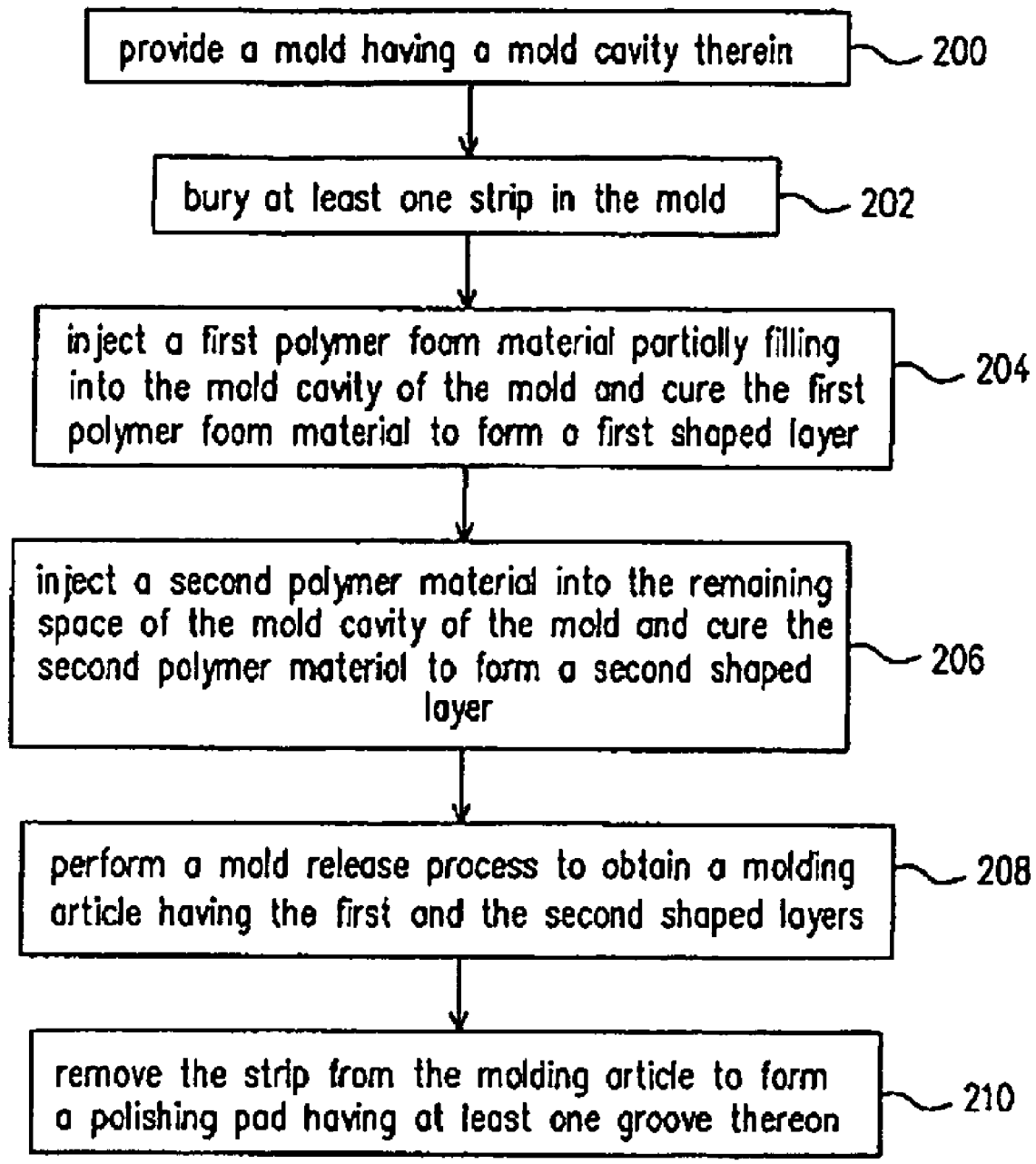
FIG. 2 schematically illustrates a flow chart of manufacturing a polishing pad with a two-layered structure according to a second preferred embodiment of the present invention.

FIG. 2 schematically illustrates a flow chart of manufacturing a polishing pad with a two-layered structure according to the second preferred embodiment of the present invention. Referring to FIG. 2, a mold having a mold cavity is provided (step 200). The size of the mold cavity is suitable for forming a desired polishing pad. Thereafter, strips are buried in the mold (step 202). A cross-sectional shape of the strips comprises a polygon form, an arc form or an irregular form; for example, a triangular shape, a hexagon shape, a circular shape, a square shape, a rectangular shape, a spiral shape, a tree-form or a radiative form. Those strips are arranged to form a radiative form, a concentric circle form, a grid form, a triangle form, a spiral form, a rhombus form or a perforation form. In this embodiment, the material of the strips comprises a polymer material or a metal material, wherein the polymer material can be polypropylene, polyethylene or polytetrafluoroethylene, for example.

After the strips are buried in the mold cavity of the mold, a first polymer foam material, such as a polyurea foam material, is injected into and partially fill the mold cavity of the mold by a reaction injection molding means. Afterwards, the first polymer foam material is cured to mold the first polymer foam material into a first shaped layer (step 204). Thereafter, a second polymer material is injected into the remaining space of the mold cavity of the mold, wherein the second polymer material comprises polyurea material, a silicone rubber, polybutadiene rubber,—poly (vinyl chloride) latex or—poly (methyl methacrylate) latex. Afterwards, the second polymer material is cured to mold the polymer material into a second shaped layer (step 206).

A mold release process is performed to obtain a molding polymer article having two shaped layers (step 208), wherein the hardness of the first shaped layer is higher than that of the second shaped layer. In this embodiment, the hardness of the first shaped layer is 30 to 80 shore D, and the hardness of the second shaped layer is 5 to 60 shore A. During a polishing process, the harder first shaped layer provides a better flatness, while the softer second shaped layer serving as a buffer layer provides a better uniformity.

Thereafter, the strips on the molding article are removed to form a polishing pad having grooves thereon (step 210). The strips are removed from the molding article by a scraping method or by applying an external force to draw out the strips.

The pattern of the grooves on the polishing pad is transferred from the strips buried in the mold cavity of the mold, so that the pattern of the grooves comprises a radiative form, a concentric circle form, a grid form, a triangle form, a spiral form, a rhombus form or a perforation form. Additionally, in this embodiment, a width of the grooves is about 0.5 to 15 mm, a depth of the grooves is about 0.2 to 2.5 mm, and a pitch of the grooves is about 0.2 to 20 mm.

It should be noted that the strips comprise a decomposable material or a water-soluble polymer material. Consequently, after the mold release process is performed and the molding article is obtained (step 208), a decomposed process or a hydrolysis process can be performed to remove the strips on the molding article and then the polishing pad having grooves thereon is obtained.

In the present invention, the strips can be replaced by dots. That is, the dots are previously buried in the mold and then the polymer foam material is injected into the mold cavity of the mold. The polymer foam material is cured and molded. Thereafter, a mold release process is performed to obtain a molding polymer article. The dots in the molding article are removed from the molding polymer article to form a polishing pad having dot shaped cavities thereon.

The method of manufacturing the polishing pad of this invention is that the strips having various shapes are previously buried in the mold and then the polymer foam material is injected into the mold cavity of the mold. After the polymer foam material is cured and molded, the strips are removed by applying an external force during the removal of the skin of the molded polymer foam material. The polishing pad of this invention is not formed by performing a cutting means on a pad by a blade to form grooves thereon as the prior art. Therefore, the fabrication of this invention is simpler than the prior art method. The depth and the shape of the grooves can be easily varied according to the demand and the pattern of the grooves comprises various complex patterns, which cannot be formed by the cutting means of a blade. In addition, the problem of the macro defects formed on the polishing pad can be prevented, and therefore the performance of each polishing pad of this invention has a higher uniformity. Moreover, there is no debris produced in the manufacturing process, so that a vacuum cleaner is not necessary in this invention.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A method of manufacturing a polishing pad, comprising:
   providing a mold having a mold cavity therein;
   burying at least one strip in the mold, wherein the strip is made of a water-soluble material;
   injecting a polymer foam material into the mold cavity of the mold;
   curing the polymer foam material to mold the polymer foam material into a molding article;
   performing a mold release process to obtain the molding article; and
   making the strip hydrolyze to form a polishing pad having at least one groove thereon.

2. The method of manufacturing a polishing pad of claim 1, wherein a cross-sectional shape of the strip comprises a polygon form, an arc form or an irregular form.

3. The method of manufacturing a polishing pad of claim 1, wherein a cross-sectional shape of the strip comprises a triangular shape, a hexagon shape, a circular shape, a square shape, a rectangular shape, a spiral shape, a tree-form or a radiative form.

4. The method of manufacturing a polishing pad of claim 1, wherein a pattern of the at least one groove comprises a radiative form, a concentric circle form, a grid form, a triangle form, a spiral form, a rhombus form or a perforation form.

5. The method of manufacturing a polishing pad of claim 1, wherein the polymer foam material comprises a polyurea foam material.

6. The method of manufacturing a polishing pad of claim 1, wherein a width of the at least one groove is 0.5 to 15 mm, a depth of the at least one groove is 0.2 to 2.5 mm, and a pitch of the at least one groove is 0.2 to 20 mm.

7. A method of manufacturing a polishing pad, comprising:
providing a mold having a mold cavity therein;
burying at least one strip in the mold, wherein the strip is made of a decomposable material;
injecting a polymer foam material into the mold cavity of the mold;
curing the polymer foam material to mold the polymer foam material into a molding article;
performing a mold release process to obtain the molding article; and
making the strip decompose to form a polishing pad having at least one groove thereon.

8. The method of manufacturing a polishing pad of claim 7, wherein a cross-sectional shape of the strip comprises a polygon form, an arc form or an irregular form.

9. The method of manufacturing a polishing pad of claim 8, wherein a cross-sectional shape of the strip comprises a triangular shape, a hexagon shape, a circular shape, a square shape, a rectangular shape, a spiral shape, a tree-form or a radiative form.

10. The method of manufacturing a polishing pad of claim 7, wherein a material of the at least one strip comprises a water-soluble polymer material.

11. The method of manufacturing a polishing pad of claim 7, wherein a pattern of the at least one groove comprises a radiative form, a concentric circle form, a grid form, a triangle form, a spiral form, a rhombus form or a perforation form.

12. The method of manufacturing a polishing pad of claim 7, wherein the polymer foam material comprises a polyurea foam material.

13. The method of manufacturing a polishing pad of claim 7, wherein a width of the at least one groove is 0.5 to 15 mm, a depth of the at least one groove is 0.2 to 2.5 mm, and a pitch of the at least one groove is 0.2 to 20 mm.

14. A method of manufacturing a polishing pad, comprising:
providing a mold having a mold cavity therein;
burying at least one strip in the mold;
injecting a first polymer foam material partially filling into the mold cavity of the mold;
curing the first polymer foam material to mold the first polymer foam material for forming a first shaped layer;
injecting a second polymer material into the remaining spacing of the mold cavity of the mold;
curing the second polymer material to mold the second polymer material for forming a second shaped layer;
performing a mold release process to obtain a molding article having the first and the second shaped layers; and
removing the strip from the molding article to form a polishing pad having at least one groove thereon.

15. The method of manufacturing a polishing pad of claim 14, wherein a hardness of the first shaped layer is higher than that of the second shaped layer.

16. The method of manufacturing a polishing pad of claim 15, wherein the hardness of the first shaped layer is 30 to 80 shore D, and the hardness of the second shaped layer is 5 to 60 shore A.

17. The method of manufacturing a polishing pad of claim 14, wherein the first polymer foam material comprises a polyurea foam material.

18. The method of manufacturing polishing pad of claim 14, wherein the second polymer material comprises a polyurea material, a silicone rubber, polybutadiene rubber, poly (vinyl chloride) latex or poly (methyl methacrylate) latex.

19. The method of manufacturing polishing pad of claim 14, wherein a cross-sectional shape of the strip comprises a polygon form, an arc form or an irregular form.

20. The method of manufacturing a polishing pad of claim 19, wherein a cross-sectional shape of the strip comprises a triangular shape, a hexagon shape, a circular shape, a square shape, a rectangular shape, a spiral shape, a tree-form or a radiative form.

21. The method of manufacturing a polishing pad of claim 14, wherein a material of the at least one strip comprises a third polymer material or a metal material.

22. The method of manufacturing a polishing pad of claim 21, wherein the third polymer material comprises polypropylene, polyethylene or polytetrafluoroethylene.

23. The method of the manufacturing a polishing pad of claim 14, wherein the step of removing the strip from the molding article is performed by a scraping method or by applying a external force to draw out the strip.

24. The method of the manufacturing a polishing pad of claim 14, wherein a material of the strip comprises a decomposable material or a water-soluble polymer material.

25. The method of manufacturing a polishing pad of claim 14, wherein a pattern of the at least one groove comprises a radiative form, a concentric circle form, a grid form, a triangle form, a spiral form, a rhombus form or a perforation form.

26. The method of the manufacturing a polishing pad of claim 14, wherein a width of the at least one groove is 0.5 to 15 mm, a depth of the at least one groove is 0.2 to 2.5 mm, and a pitch of the at least one groove is 0.2 to 20 mm.

27. The method of manufacturing a polishing pad of claim 15, wherein the first shaped layer is an upper layer and the second shaped layer is a lower layer of the polishing pad.

28. The method of the manufacturing a polishing pad of claim 24, wherein the step of removing the strip from the molding article is performed by a decomposing process or a hydrolysis process.

* * * * *